M. LEBLANC.
CONDENSER.
APPLICATION FILED DEC. 5, 1906.

1,004,664.

Patented Oct. 3, 1911.
3 SHEETS—SHEET 1.

WITNESSES:

INVENTOR.
Maurice Leblanc
BY Jno. S. Green
his ATTORNEY.
in fact

M. LEBLANC.
CONDENSER.
APPLICATION FILED DEC. 5, 1906.
1,004,664.
Patented Oct. 3, 1911.
3 SHEETS—SHEET 3.
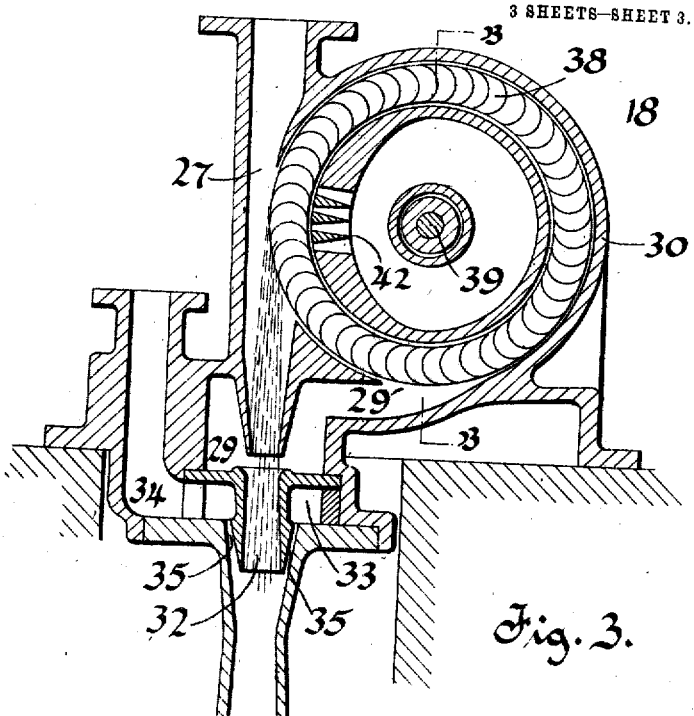
Fig. 3.
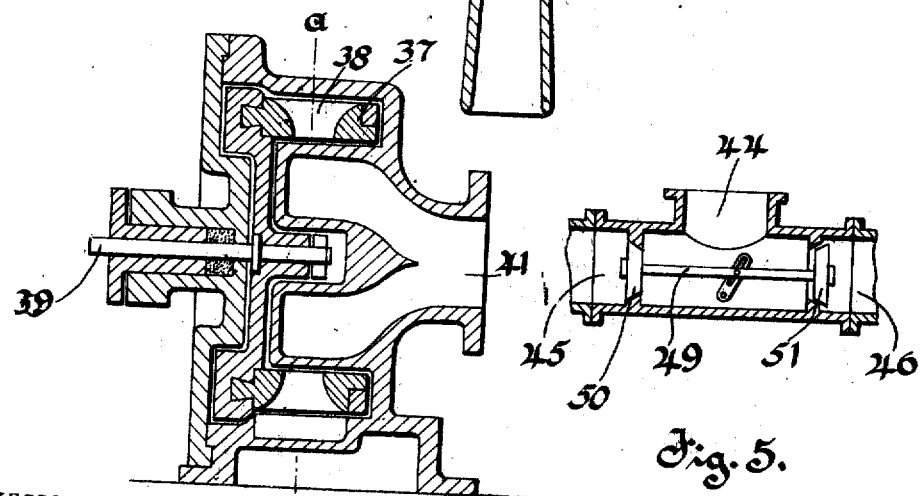
Fig. 4.
Fig. 5.
WITNESSES:
INVENTOR.
Maurice Leblanc
Jno. S. Green
BY
his ATTORNEY.
in fact

UNITED STATES PATENT OFFICE.

MAURICE LEBLANC, OF PARIS, FRANCE, ASSIGNOR TO SOCIETE ANONYME POUR L'EXPLOITATION DES PROCEDES WESTINGHOUSE-LEBLANC, OF PARIS, FRANCE.

CONDENSER.

1,004,664.      Specification of Letters Patent.      Patented Oct. 3, 1911.

Application filed December 5, 1906. Serial No. 346,473.

*To all whom it may concern:*

Be it known that I, MAURICE LEBLANC, a citizen of the Republic of France, residing at Villa Montmorency, Auteuil, Paris, France, have made a new and useful Invention in Condensers, of which the following is a specification.

This invention relates to condensers and more particularly to jet condensers.

The object of the invention is the production of an organized apparatus which is of simple construction and effective in operation.

The invention is embodied in an organized apparatus which comprises a jet condenser, a centrifugal pump, arranged to discharge condensing water and the products of condensation from the condensing chamber, and an auxiliary pump which is arranged to discharge air or non-condensing gases from the pump passages.

Figure 1:
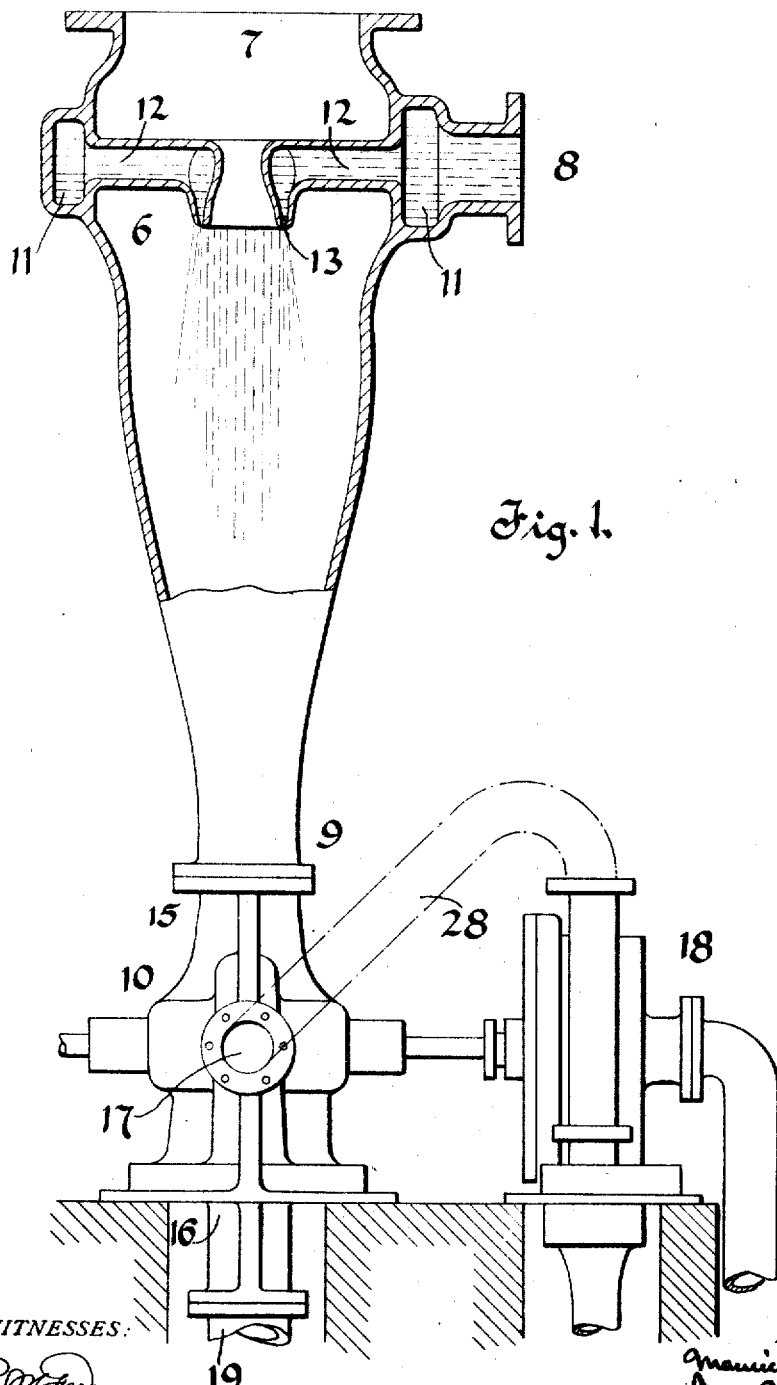
Figure 2:
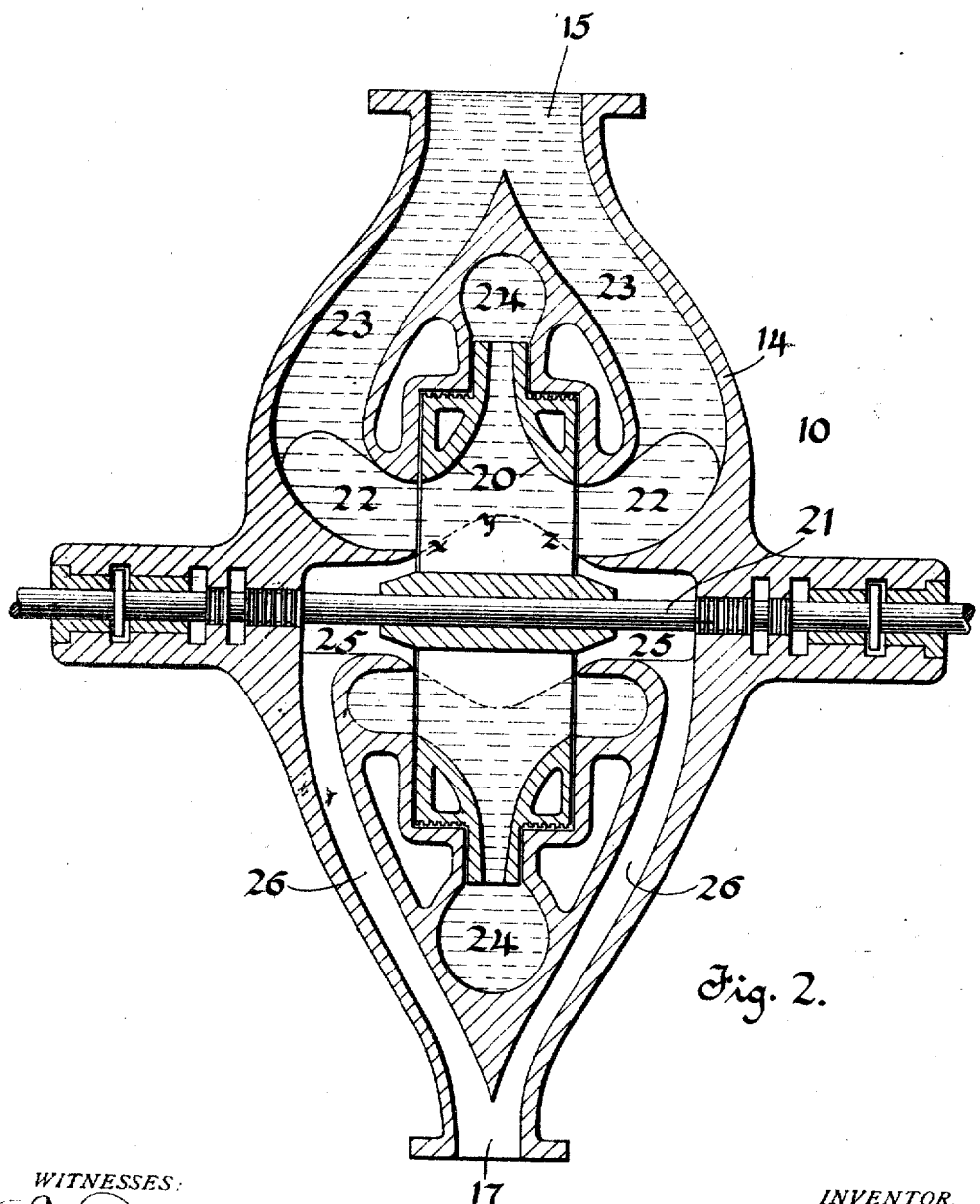

In the drawings accompanying this application, Figure 1 is a partial side view and partial section of an organized apparatus embodying my invention; Fig. 2 is a view of a pump included in my invention, the upper part of the view being a vertical section through the axis and the lower part a horizontal section through the axis; Fig. 3 is a section along the line A—A of Fig. 4; Fig. 4 is a section along the line B—B of Fig. 3; and, Fig. 5 is a section of a valve included in my invention.

The condenser chamber 6 consists of a vertically-disposed fluid passage, the walls of which are provided with a port 7, which communicates with the source of vapor to be condensed, a port 8, which communicates with a supply of condensing water, and a discharge port 9, which communicates with the suction port of a centrifugal pump 10. An annular chamber 11, formed integrally with the walls of the chamber 6, communicates with the port 8 and through suitable passages 12 with a discharge nozzle 13. The walls of the chamber 6 converge from the chamber 11 to the port 9.

The nozzle 13 is located directly above the port 9 and is so constructed that the condensing water is delivered to the chamber 6 in a mass of separate drops or spray, which entirely fills the lower or converging portion of the chamber 6. All the vapor entering 51 the port 7 and passing through the chamber 6 to the port 9 must come into intimate contact with the spray discharged from the nozzle 13 and the converging walls of the chamber 6 gradually compress or collect the mass of spray passing through the condensing chamber into a solid stream, which is delivered through the port 9 to the pump 10. The steam or vapor entering the port 7 is condensed by the water discharged from the nozzle 13 and is discharged with the water through the port 9. The uncondensed steam, the air and other non-condensable gases encountered in the condensing chamber 6 are mechanically carried by the stream of water through the port 9 and delivered to the pump 10. The pump, which is specially constructed, is provided with a stationary casing 14, in which a suction port 15, a discharge port 16 and an auxiliary or air discharge port 17 are located. The suction port 15 communicates with the port 9 of the condenser, the air port 17 communicates with a fluid-ejecting device 18 and the discharge port 17 communicates with a sump pit or well through a pipe 19 with which it is provided. The pipe 19 is provided, as is customary, with a valve (not shown), which prevents the return of water to the pump.

The rotor element 20 of the pump is mounted on a shaft 21, which is provided with suitable bearings, located in the casing 14. Chambers 22 are located on each side of the rotor element and communicate with the suction port 15 through passages 23 formed within the casing. The vortex or worm 24 of the pump is formed in the usual manner and communicates with the discharge port 16. Cylindrical chambers 25 are formed on each side of the rotor element around the shaft 21 and communicate with the port 17 through passages 26 formed in the casing.

The water from the condensing chamber 6 discharged through the port 9 is divided into two streams by the passages 23 and delivered to the chambers 22, from which it is delivered to the working passages of the rotor 20. The air or other non-condensable gases entrained by the water is separated from it by centrifugal force, the water being projected outwardly and air or gas forced inwardly around the shaft. The line of separation between the water and gas, to some extent, effects the form of the surface of rotation, the bounding lines of which are shown in Fig. 2 by dotted lines x, y, z. If the non-condensable gases separated from the water were not removed from the pump, they would eventually invade the chambers 22 and thereby obstruct the admission passages 23.

With the pump constructed as described and the port 17 connected to an air ejector, the danger of choking the pump with air or gas is overcome, since the air is removed from the chambers 25 as fast as it is separated from the water and there is, in reality, a partial vacuum around the shaft and in the chambers 25. The non-condensable gases exhausted from the pump by the fluid-ejecting device contain very little, if any, water, because they cannot pass from the chambers 22 into the chambers 25 without passing through a portion of the rotor passages and being subjected to the separating action of the centrifugal force. An ordinary dry vacuum pump could, therefore, be used to exhaust the non-condensable gases from the pump 10, but I have shown a preferred form of air exhauster or ejector in the drawings.

The ejector 18 consists of a combining tube 27, which communicates through a pipe 28 with the port 17 of the pump 10 and which communicates with a collecting chamber 29. The collecting chamber 29 communicates through a passage 29' with the interior of a pump casing 30 and it also communicates with a diffusing spout 31. A collecting nozzle 32 is located in the collecting chamber 29 and between the combining tube 27 and the diffusing spout 31. An annular chamber 33 is formed between the walls of the collecting chamber 29 and the nozzle 32, which communicates through a passage 34 with a source of steam supply and through an annular passage 35 with the diffusing spout 31. A pump impeller 37, which is provided with a plurality of vanes 38, is located within the casing 30 and is suitably mounted on a shaft 39, which is driven at high speed by any suitable means. Water is admitted to the pump casing through a port 41 and is delivered to the vanes 38 through supply nozzles 42 in such a manner that the vanes will break the water into a mass of separate drops or spray and discharge it at a high velocity through the combining tube 27. The walls of the combining tube converge and the mass of separate drops or spray discharged from the blades 38 is collected into a stream by the converging walls of the tube 27 and delivered to the collecting nozzle 32, which, in turn, delivers the stream to the converging and diverging spout 31, which communicates with the atmosphere. The air or non-condensable gases in the combining tube 27 readily mingles with the spray discharged from the blades 38 and is mechanically carried in small globules or bubbles by the stream formed by the converging walls of the combining tube and discharged into the atmosphere.

The annular chamber 33, which communicates with the source of steam supply through the passage 34 is effective as a fluid ejector and is utilized, auxiliary to the pump, in discharging the air from the passages at the time of starting the pump.

In order to start the condenser, the engine to which it is connected being at rest, the centrifugal pump 10 and the pump of the air ejecting device are started and steam is admitted through the passage 34 to the steam-ejecting nozzle to create a vacuum in the apparatus. The water rises, due to the vacuum in the suction pipes, and flows into the nozzle 13, by which it is delivered to the condensing chamber and into the nozzles 42, by which it is delivered to the rotating blades 38. When the flow of water is established, the steam supply to the passage 34 is cut off, and the engine to which the condenser is connected is then supplied with steam. The water delivered to the condensing chamber 6 is under a head which corresponds to the difference of pressure between the condensing chamber and the atmosphere and this head, in conjunction with the force acquired by the water falling through the condensing chamber, is effective in compressing the air and discharging it into the pump 10. The air separated from the water in the pump 10 is, therefore, under relatively high pressure as compared to the pressure in the chamber 6 and consequently the ejecting device 18 will be comparatively small.

An accidental stopping of the pumps will not necessitate the stopping of the engine to which the condenser is connected, as the engine can freely exhaust into the atmosphere through the passages of the pump 10 without being subjected to an appreciable back-pressure. A valve, as shown in Fig. 5, may be advantageously used. This valve when utilized would be placed between the condenser and the engine. The valve is provided with a port 44 arranged to communicate with the exhaust port of the engine, a port 45 arranged to communicate with the atmosphere and a port 46 arranged to communicate with the condensing chamber. A valve 49 is provided with disks 50 and 51, which respectively control the flow of fluid from the port 44 through the ports 45 and 46. The arrangement is such that when the port 44 is closed to the atmosphere or to the port 45 by the disk 50, the disk 51 opens communication between it and the condenser chamber through the port 46. With such an arrangement, if the pump should stop working for any reason, the engine could freely exhaust into the atmosphere while the pumps were being repaired. When the pumps were reënergized and under way the exhaust steam could again be turned into the condenser by shifting the valve.

In accordance with the provisions of the patent statutes, I have described the principles of operation of my invention, together with the apparatus which I now consider to represent the best embodiment thereof; but I desire to have it understood that the apparatus shown is only illustrative and that the invention can be carried out by other means.

What I claim is:

1. The combination with a device adapted to separate air from water and to discharge the water, of a condensing chamber connected to the inlet of said device and constructed so that air passing therethrough is compressed.

2. The combination with a centrifugal device adapted to separate air from water and to discharge the water, of a condensing chamber connected to the inlet of said device and constructed so that air passing therethrough is compressed.

3. The combination with a device adapted to separate air from water and to discharge the water, of a condensing chamber connected to the inlet of said device and constructed so that air passing therethrough is compressed and an agent for removing the air from said device.

4. The combination with a centrifugal device adapted to separate air from water and to discharge the water, of a condensing chamber connected to the inlet of said device and constructed so that air passing therethrough is compressed, and an air pump connected to said device so as to remove the air therefrom.

5. The combination with a centrifugal pump constructed so as to separate water from air and to discharge the water, of a condensing chamber connected to the inlet of said pump and constructed so that air passing therethrough is compressed, a water spray nozzle in said chamber and an air pump connected with said centrifugal pump in such a manner that the air in said centrifugal pump is removed independently of the water discharged therefrom.

In testimony whereof I have hereunto subscribed my name this 21 day of November, 1906.

MAURICE LEBLANC.

Witnesses:
 ALBERT DELAS,
 HANSON C. COXE.